July 20, 1948.　　　K. P. PUCHLOWSKI　　　2,445,454
REACTOR OPERATED ELECTRONIC CONTROL SYSTEM Filed June 30, 1943　　　　　　　　　　　　3 Sheets-Sheet 2

WITNESSES:

INVENTOR
Konstanty P. Puchlowski
BY
Paul E. Friedemann
ATTORNEY

Patented July 20, 1948

2,445,454

UNITED STATES PATENT OFFICE 2,445,454

REACTOR OPERATED ELECTRONIC CONTROL SYSTEM

Konstanty P. Puchlowski, Wilkinsburg, Pa., assignor to Westinghouse Electric Corporation, East Pittsburgh, Pa., a corporation of Pennsylvania Application June 30, 1943, Serial No. 492,962

9 Claims. (Cl. 323—89)

My invention relates to electronic systems for controlling the supply of power from an alternating-current source to a current consuming apparatus, and more specifically to systems in which such a control is effected by means of a saturable reactor whose alternating-current winding is arranged in the power supply circuit and controlled as to its reactance by a grid controlled gaseous discharge rectifier.

Ordinarily, in such systems, a change in A.-C. supply voltage is accomplished by a change in the saturating current of the reactor so that the power in the load has the tendency to react in a still larger degree on such voltage changes. To be sure, if a system of this type is provided with an automatic regulation, a corrective control action will be produced tending to compensate for the disturbing effect of supply voltage fluctuations. However, this action may involve an appreciable time delay. As a result, the power will tend to fluctuate about a certain average value, i. e., the accuracy of regulation is rather limited. Thus, for instance, in systems for controlling the temperature of a furnace or the like heated apparatus, the occurrence of voltage fluctuations in the supply line has the effect of causing appreciable variations in the temperature to be controlled especially if the system contains droop correcting devices tending to magnify any change in voltage. Similarly, in control systems for controlling a lamp circuit, the luminous output is apt to vary considerably in response to variations of the supply voltage.

It is an object of my invention to provide a reactor-operated electronic control system which avoids the above-mentioned shortcomings of the known systems of this type.

A more specific object is to improve the accuracy and stability of voltage control of such a system by reducing or eliminating the disturbing effect of voltage fluctuations in the power supply.

It is also an object of my invention to afford the just-mentioned advantages independently of the presence of a droop correction, i. e., to reduce or prevent the disturbing augmenting effect otherwise caused by a droop corrector on variations of the supply voltage.

Another object in conjunction with any of the foregoing is to provide a reactor-operated electronic control system with a voltage compensator which permits an adjustment of its compensating effect relative to the characteristics of the reactor and the conditions of the load.

The invention also aims at obtaining a compensation for line voltage fluctuations with the aid of regulating means of great simplicity as compared with the control and discharge means usually required in such systems and at achieving these advantages by utilizing for the purpose of voltage compensation the control circuit of the saturable reactor without interfering with the normal function and adjustability of the reactor control circuits.

According to my invention, a voltage regulating device or network is disposed between the alternating-current supply of the load and the grid circuit of the above-mentioned gaseous discharge device to render the magnitude of the saturating reactor current dependent on variations in supply voltage in such a way that the reactance of the reactor is varied in the same direction as the supply voltage. Such a corrective device will operate as soon as the supply or line voltage has undergone a change or has started to drift and will cause the load voltage to remain practically independent of line voltage fluctuations thus removing the cause for a variation in power consumption.

According to another and more specific feature of the invention, the just mentioned corrective effect is obtained by providing a rectifier circuit between the supply line and the grid circuit of the gaseous discharge rectifier so as to utilize for the desired voltage-compensating effect the very principle of the basic load control by a magnetic bias of the saturable reactor.

In another aspect of the invention, the compensating circuit for preventing the load voltage to react on line voltage fluctuations is equipped with amplification means for augmenting the corrective effect so that the relative or percentile change in compensating voltage is greater than the relative or percentile change in line voltage causing the corrective operation.

A further feature of the invention, more specific than the foregoing, is to employ in the voltage compensating circuit a saturated high-vacuum diode whose filament circuit is fed from the supply line and thus responds to fluctuations in supply voltage, and whose plate circuit is connected to the grid circuit of the gaseous discharge device for reactor control. Such a diode connection provides both for the necessary rectification and the aforementioned amplification of the voltage changes to be compensated.

According to still another feature, the invention provides adjustable circuit means arranged in the control network of the above-mentioned grid circuit so as to permit varying and adjusting the amount of amplification, i. e., the intensity of compensating action, for example, by adjusting the amplitudes relative to each other of a component alternating current grid voltage of the discharge device supplied by a phase shifting arrangement and a component direct-current grid voltage supplied by the corrective voltage compensator so that the corrective effect can be regulated or calibrated in accordance with different operating conditions and requirements.

These and other objects and features of the invention will be apparent from the following description of the embodiments represented by the drawings, in which:

Figs. 3, 4 and 5 show voltage and current curves for elucidating the operation of the same control system, while

Figure 1:
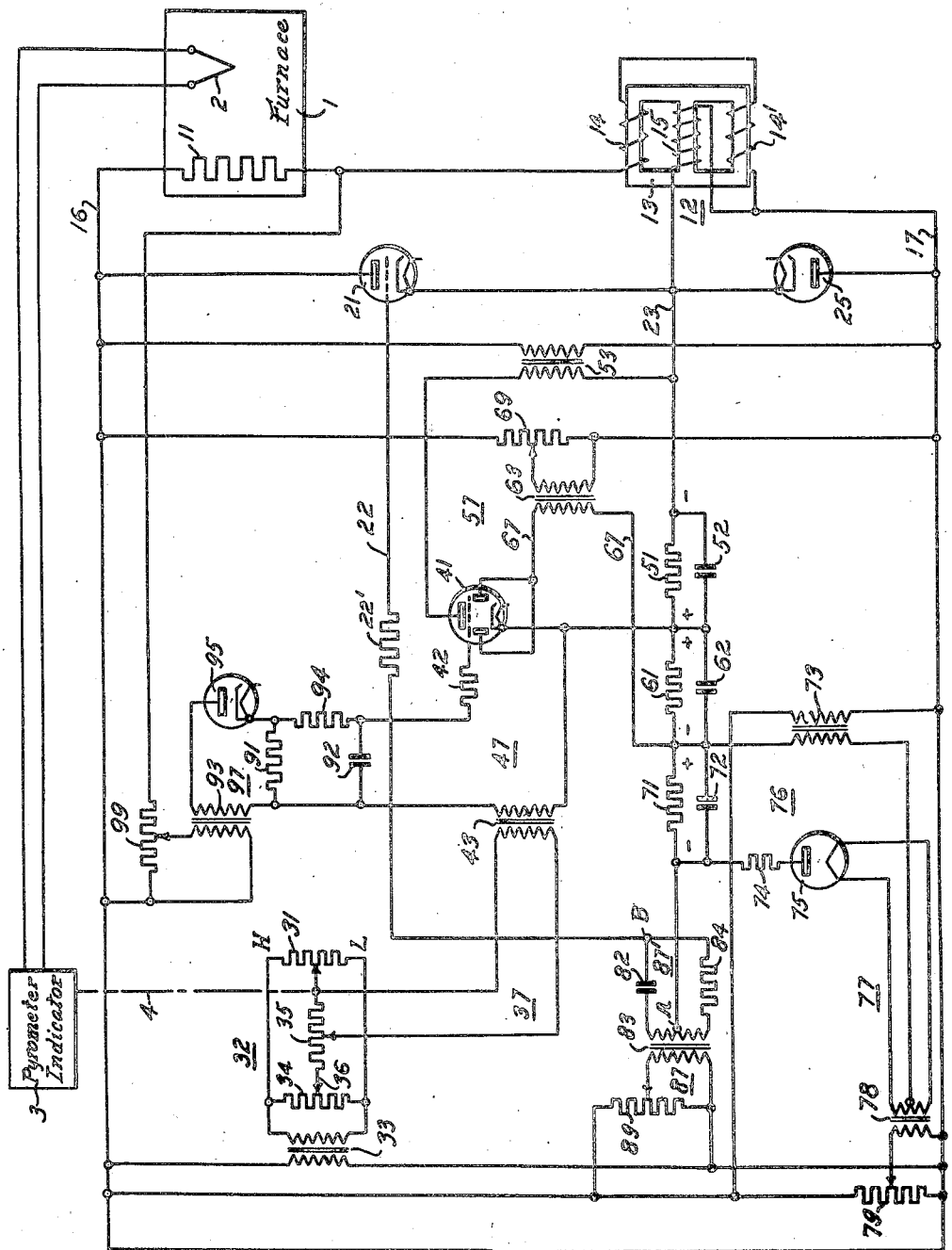
Figure 1 is a circuit diagram of a system for regulating and controlling the temperature of an electric resistance furnace.

Referring to Fig. 1, numeral 1 denotes an electric furnace heated by means of a heating resistor 11. The resistor is connected to supply mains 16 and 17 fed from a suitable alternating-current source 18. The power circuit of resistor 11 includes in series connection, the alternating current windings 14 and 14' of a saturable reactor 12 whose magnetic core 13 is also provided with a premagnetizing direct-current winding 15. Hence, the current supplied from the alternating current source or line to the heating resistor 11 is controlled by the variable reactance of coils 14 and 14' which, in turn, depends on the state of magnetization produced in core 13 by the premagnetizing direct-current winding 15. The windings 14 and 14' counteract each other with respect to their inductive effect on coil 15, so that the voltage induced by them in coil 15 is substantially equal to zero.

In order to supply the premagnetizing control winding 15 of the saturable reactor 12 with energizing direct current, a rectifying circuit is provided. This circuit includes a grid controlled gas or mercury vapor rectifying device 21 consisting, preferably of a hot cathode type device as known under the trade name "Thyratron." The plate circuit of this device is connected in series with reactor coil 15 between the supply leads 16 and 17. A second discharge device 25 also of the gas or vapor filled hot-cathode type is connected across coil 15, the direction of current flow in device 25 being so chosen that it is inactive during the flow periods of discharge device 21. When device 21 conducts, a rectified current is passed through the control coil 15 of the reactor. When the instantaneous current in device 21 passes through its peak and begins to decrease, the magnetic energy stored in the high inductance coil 15 will cause the reversal of polarity across the coil terminals, so that the rectifier 21 will stop conducting whereas the discharge device 25 will break down and conduct current so that the current coil 15 will continue flowing throughout the negative half cycle of the A.-C. supply voltage. Thus a continuous unidirectional current will flow in coil 15, the amount of ripple of this current depending upon the L/R ratio (time constant) of the coil 15 and the position of the firing point of discharge tube 21 relative to the cycle of the supply voltage. This current can be controlled by varying the grid voltage of the tube 21 so as to shift the firing point. In this manner, the reactance of the saturable reactor, effective in coils 14 and 14', is varied with the result of controlling the load voltage across the heating resistor 11, and hence its temperature.

In order to control the grid voltage of discharge tube 21 in the manner just mentioned, a regulating network is provided which, for the purpose of a more convenient description, can be considered to be composed of a number of subsidiary circuits and networks, although it will be understood that these component sections are electrically, electronically or magnetically interlinked with one another and with the above-mentioned power circuit and rectifier circuit, and hence contain a number of circuit elements in common with one another. Thus, the following component circuits of the regulating network will be distinguished and described: the grid circuit of the gaseous discharge rectifier 21, a phase shift circuit, a temperature-responsive circuit (hereinafter called "measuring circuit"), a control circuit, a droop correction circuit, a cut-off and maximum load adjustment circuit, and a compensating circuit.

The grid circuit proper of the discharge device 21 extends over the conductor 22 and a grid resistor 22' to a point marked B, thence over the secondary portion 87' of the phase shift circuit including a capacitor 82 and a resistor 84 to a point marked A, thence through a series connection of three resistors 71, 61 and 51 to a lead 23 connected to the cathode of the discharge device 21. Three capacitors 72, 62 and 52 are connected across resistors 71, 61 and 51, respectively.

The secondary portion 87' of the phase shift circuit is fed through a transformer 83 from a potentiometer 89 connected across the supply mains 16 and 17. The voltage between points A and B supplied by this phase shifting circuit constitutes the alternating current component ($E_1$) of the grid voltage of tube 21 and is a sine wave voltage shifted in phase by 90° lag with respect to the alternating current anode supply voltage of the tube 21.

Each of the series-connected resistors 51, 61 and 71 serves to impress another direct-current component grid voltage ($E_2$, $E_3$ and $E_4$ respectively) on the grid circuit. These other component voltages are rectified and filtered voltages. The capacitance of the parallel-connected capacitors 52, 62 and 72 is so rated that the resistor-capacitor combinations have a high-time constant relative to the cycle duration of the line voltage. As a result, the component grid voltages across resistors 51, 61 and 71 respectively, are essentially direct-current voltages. The polarities of these voltages are as indicated by (+) and (—) signs. The resultant grid voltage ($E_G$) of tube 21 is the algebraic sum of the above-mentioned alternating current component ($E_1$) and three direct-current components ($E_2$, $E_3$, $E_4$).

Figure 3:
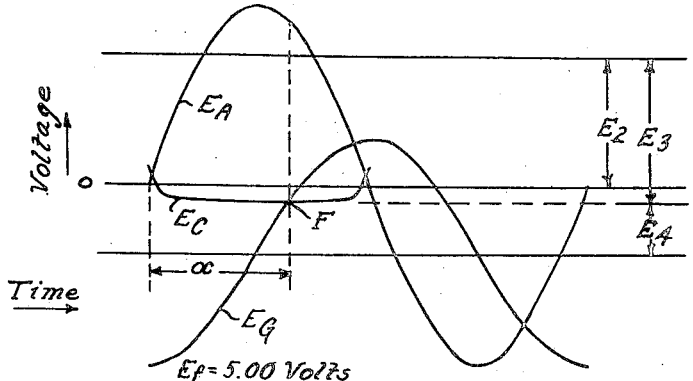

The resultant grid voltage ($E_G = E_1 + E_2 + E_3 + E_4$) is represented in the diagram of Fig. 3 by the curve marked $E_G$. Curve $E_A$ represents the anode supply or line voltage of discharge tube 21 and curve $E_C$ the critical grid voltage. The magnitudes of the direct-current components of the grid voltage $E_G$ are separately indicated by the ordinate values $E_2$, $E_3$, and $E_4$. The intersection of the resultant grid voltage $E_G$ with the critical voltage $E_C$ determines the breakdown or firing point F of the discharge device 21, and hence the firing angle $\alpha$. When one or several of these direct-current voltages vary, the firing angle is displayed with the effect of varying the saturating current in coil 15 of reactor 12 and hence the load voltage of resistor 11 accordingly.

The component grid voltage $E_2$ across resistor 51 (Fig. 1) is produced by the control circuit under control by the measuring circuit to be described presently. The measuring circuit contains a temperature responsive control element consisting, for instance, of a thermocouple 2 which is arranged at the furnace 1 in sufficient proximity to the heating resistor 11 to respond to the furnace temperature to be regulated. The thermocouple 2 is connected to a pyrometer indicator 3 which includes a device for measuring the variable thermocouple voltage and for translating this voltage into a correlated mechanical movement of a shaft or connecting member 4 which is attached to the slider of a control potentiometer 31.

Figure 2:
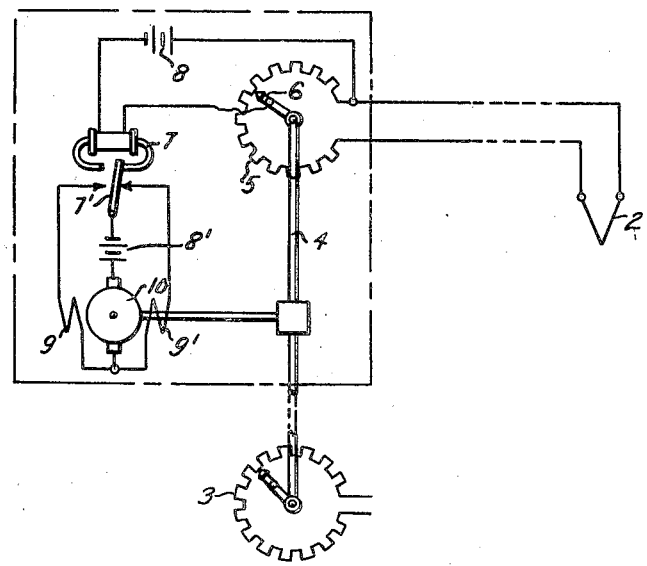
Fig. 2 shows another circuit diagram and represents an embodiment of a temperature-responsive device to be used in the control system of Fig. 1.

An embodiment of a measuring circuit applicable for the just-mentioned purpose is exemplified in detail by Fig. 2. According to this figure, the thermocouple 2 is connected across a potentiometer 5 engaged by a movable slider 6 which is mounted on a shaft 4 and connected through a polarized relay 7 with one pole of a voltage source 8 whose other pole is attached to one terminal of the potentiometer 5. The voltage of source 8 is opposite to the thermocouple voltage. The relay 7 has a contact device 7' connected to a current source 8' and also to coils 9 and 9' which control the direction of rotation of a drive 10 acting on the shaft 4 of the slider 6. The drive is shown as an electric motor with coils 9 and 9' forming oppositely functioning field coils in order to effect a reversal of its direction of rotation depending upon whether coil 9 or 9' is energized. However, any other type of reversible drive may also be chosen. For instance, coils 9 and 9' may represent the energizing windings of a reversible coupling inserted between a unidirectional drive motor and the shaft 4. Shaft 4 is also connected with the slider of the control potentiometer 31.

When in operation, the voltage of thermocouple 2 is balanced by the bucking voltage supplied by source 8 when the slider 6 is in an angular position indicative of the thermocouple voltage, and hence of the instantaneous furnace temperature. If this temperature changes the balance is disturbed and the relay 7 is energized by an unbalance current and causes its contact device 7' to energize either coil 9 or 9', depending upon whether the temperature has increased or decreased, and the slider 6 will depart from its previous position to assume a new balance position. Thus, the drive 10 is caused to actuate shaft 4 and slider 6 in the direction required to eliminate the unbalance. Consequently, the system has the tendency to move the slider 6 so as to maintain the balance of voltages, the relay 7 being deenergized as long as the slider position is representative of the furnace temperature. Due to its connection with slider 6, the slider of the control potentiometer 31 is automatically adjusted so that its position relative to the appertaining resistor is also indicative of the furnace temperature. An indicator or recorder (not shown) is preferably connected with shaft 4 or one of the two sliders in order to indicate to the operator the temperature measured by the thermocouple.

Reverting to Fig. 1, it will be seen that the control potentiometer 31 forms part of a control circuit composed of four circuit sections marked 32, 37, 47 and 57, respectively.

Section 32 consists of a potentiometric bridge circuit and contains the control potentiometer 31 in bridge connection with an adjusting potentiometer 34. The sliders of potentiometers 31 and 34 are electrically connected by the bridge diagonal 36 which includes another potentiometer denoted by 35. The bridge circuit 32 is fed from a transformer 33 whose primary is connected to the supply mains 16 and 17. A secondary voltage of a few volts, for instance about 5 volts, of transformer 33 is as a rule sufficient for a satisfactory operation of the bridge system.

Section 37 of the control circuit is connected to the slider and one terminal of the diagonal potentiometer 35 and feeds the primary of a transformer 43.

Section 47 of the control circuit contains a resistor 42 and is connected to the secondary of transformer 43 and represents the grid circuit of an electronic rectifier here consisting of the triode section of a double purpose high-vacuum tube 41. The plate circuit 57 of this triode section is energized from a transformer 53 connected to the supply mains 16 and 17 and impresses a load voltage across the resistor 51 of the grid circuit of discharge device 21.

The droop correcting circuit is part of the grid circuit 47 and will be discussed in a later place.

The above-described portion of the regulating network operates as follows. If, for example, the furnace temperature increases, the slider of potentiometer 31 is moved towards point H due to the action of the pyrometer indicator 3. This changes the adjustment of the potentiometer bridge 32 and causes an increased A.-C. voltage to be impressed through circuit section 37 on the primary of transformer 43. The A.-C. grid voltage in circuit 47 of tube 41 is increased accordingly. The polarities of the transformers and the characteristic of the triode section of tube 41 are such that the grid voltage in circuit 47 is normally 180° out of phase with respect to the plate voltage in circuit 57. Hence, the plate current of the triode section of tube 41 will decrease and so will the direct-current voltage across resistor 51. Consequently, the tube 21 will break down later in the course of each positive half cycle. As a result the direct-current saturating current in coil 15 of reactor 12 is decreased. This, in turn, causes an increase in reactance and, hence, a decrease of load voltage across the heating resistor 11. Similarly, a decrease in furnace temperature will result in an increase of voltage across the heating resistor 11.

Transformer 33 is a step-down transformer so that the bridge section 32 of the control circuit is supplied with voltage in the order of a few volts and requires only small potentiometer units. The transformer 43 is a step-up transformer and the triode section of tube 41 acts as an amplifier so that a high degree of amplification is obtained. Owing to this fact, a high degree of sensitivity is possible so that a slight motion of the slider at 31 causes a considerable change in the load voltage across resistor 51 and hence across the heater 11.

Considering the instantaneous polarities of the transformers and the fact that the useful range of control for the triode portion of the high vacuum tube 41 is for negative grid voltages (this is equivalent with the 180° phase displacement between the alternating current plate and grid voltages of the triode), it will be seen that a change in position of the slider of potentiometer 34 will result in the shifting of the operating sector of the potentiometer 31. Thus, potentiometer 34 serves for adjusting the datum value of the heating temperature to be kept constant by the operation of the control system. Since the voltage of circuit 37 depends on the adjustment of potentiometer 35, this potentiometer serves for adjusting the sensitivity of control, i. e., the amount of change in load voltage corresponding to a definite temperature change or to a definite amount of slider displacement of potentiometer 31.

The droop correcting circuit 97 is so connected with the grid circuit 47 of tube 41 that it imposes a corrective control on the direct-current voltage $E_2$ developed across resistor 51. The droop correcting circuit includes a potentiometer 99 connected across the heating resistor 11. The slider of potentiometer 99 is connected to the primary of a transformer 93 whose secondary is connected through the plate circuit 97 of a high-vacuum rectifier tube 95 with a resistor 91 which, in turn, is coupled to the grid circuit 47 by means of a parallel capacitor 92 and a series resistor 94. The voltage impressed across resistor 91 depends on the primary voltage tapped from the potentiometer 99 and hence it is proportional to the load voltage of the heating resistor 11.

This droop correcting circuit acts as a boosting device. When the thermal load of the furnace is increased, and the temperature will start to drop, the control system will increase the load voltage across resistor 11 in order to prevent the decrease in furnace temperature. Without a boosting device, however, the temperature would be stabilized at a slightly lower level than before, and in order to prevent this droop a readjustment of the system would be necessary. The droop correcting circuit, as described, responds to any change in load voltage in such a way that it will tend to still increase this voltage as soon as the voltage has started to rise. The amount of droop correction thus obtained can be varied by adjusting the slider of potentiometer 99.

The component direct-current voltage $E_3$ effective across resistor 61 is produced and controlled by the cut-off and maximum load adjustment circuit described hereinafter. This circuit includes a potentiometer 69 connected across the power circuit between mains 16 and 17. The secondary side of the potentiometer feeds a transformer 63 whose secondary is connected through leads 67 to the diode section of the above-mentioned tube 41 in series with resistor 61. Thus, the direct-current voltage $E_3$ impressed across resistor 61 depends upon the adjustment of potentiometer 69. This voltage acts in opposition to the direct-current voltage effective across resistor 51 and determines the maximum direct current obtainable from the rectifier tube 21 during the normal operation and, consequently, the maximum load of heater 11. Hence, the maximum load current can be varied by adjusting the slider of potentiometer 69.

The component grid voltage $E_4$ effective across resistor 71 is produced and controlled by the compensating circuit. This circuit includes a half-wave rectifier tube 75 whose plate circuit 76 is energized by a line-connected transformer 73 over a series resistor 74. The plate circuit is connected across resistor 71. The filament circuit 77 of the tube 75 is fed through a transformer 78 from a potentiometer 79 connected across the supply mains 16 and 17.

In order to properly understand the purpose of the compensating circuit 77 it should be remembered that without this circuit the percentile change in load voltage across resistor 11 will be considerably higher than the corresponding percentage of line voltage change. As a matter of fact, the load voltage would change in proportion to changes in line voltage only if the resistance and reactance of the load circuit remained constant. However, in a circuit without a compensator, an increase of line voltage will cause an increase in the saturating current of coil 15 and a decrease of the reactance of the saturable reactor 12, and this will additionally increase the voltage across the load 11. Similarly, a decrease in line voltage will result in an increase of reactance and further decrease in load voltage. The just-mentioned variations of the saturating current in the same sense as those of the line voltage are due to the fact that the component grid voltages of the rectifier 21 impressed across resistors 51 and 61 will vary simultaneously with the line voltage. Since these two component voltages oppose each other, the resultant grid voltage remains practically unchanged. Thus, the firing angle of the thyratron tube 21 tends to remain practically constant while its anode voltage will vary in proportion to the line voltage resulting in the previously described variations of the saturating current.

To counteract these tendencies, the function of the compensating circuit is to introduce an additional direct-current component ($E_4$) into the thyratron grid circuit and to vary this component with the line voltage in such a way as to bring about the variation of the saturating current in the direction just opposite to that described above. Thus, for an increase in line voltage the change in the compensating component $E_4$ increases the thyratron firing angle and hence decreases the current in coil 15, and conversely, for a decrease in line voltage decreases, i. e., advances the firing angle thus increasing the premagnetizing current of the saturable reactor and decreasing its reactance.

In order to secure the just-mentioned action, the compensating voltage component $E_4$ across resistor 71 should vary with the line voltage in such a way as to not only overcome the effect of variations of the thyratron anode voltage but also to vary the thyratron output in the sense opposite to the variation of line voltage. To accomplish this, the change of $E_4$ in per cent should be in general higher than the corresponding percentile change in line voltage. For instance, if the line voltage change constitutes 10% of the normal operating voltage, the correcting component change should amount to about 30% of its previous value. This change-augmenting effect can be secured by using at 75 a high-vacuum saturated diode as a rectifier whose current is practically independent of the plate voltage but is highly affected by the filament temperature, i. e., the filament voltage.

Figure 4:
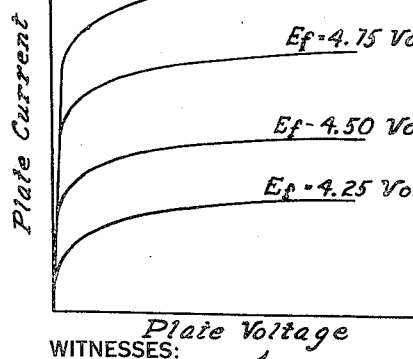

The characteristics of a saturated diode tube are shown in Fig. 4. This figure indicates a family of curves representing the plate current in dependence upon the plate voltage for different filaments voltages $E_f$ of 4.25, 4.50, 4.75, and 5.00 volts, respectively. In the utilized voltage range the plate current is virtually constant regardless of variations in plate voltage and depends substantially only on the magnitude of the filament voltage $E_f$.

Figure 5:
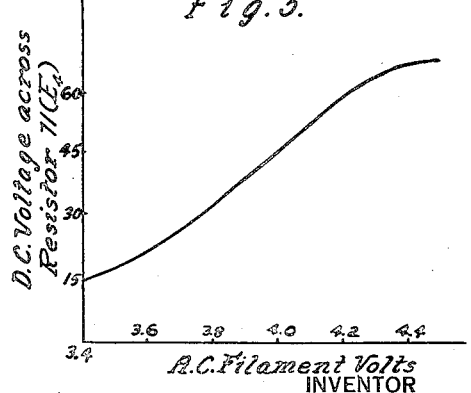

In a circuit as shown in Fig. 1, such a tube will act as a half-wave rectifier, but due to the high time constant of the impedance combination 71' and 72, a practically direct-current voltage will develop across resistor 71, this voltage being effective as a negative compensating component in the grid circuit of the thyratron 21. The filament voltage of tube 75 supplied by transformer 78 varies in proportion to the line voltage variations but the resulting variations of the voltage across resistor 71 are amplified several times. As an example, a change of line voltage and hence of the filament voltage by 2.5% will cause a change in voltage across resistor 71 amounting to about 13%. In other words, the saturated diode tube, used as an indicator of line voltage variations, performs also the function of an amplifier of relative voltage variations and not that of a conventional voltage amplifier. This is apparent from the diagram of Fig. 5 in which the ordinate values represent the direct-current voltage across resistor 71 while the abscissa indicates the corresponding filament voltages. It can be readily seen that the most advantageous operating point of the above characteristic is for $E_f=3.95$ volt, $E_4=42.5$ volts. Obviously this point should correspond to the rated line voltage whatever it may be. The proper adjustment can be obtained by means of potentiometer 79 (Fig. 1) which permits the establishment of a proper correspondence between the line voltage and the filament voltage of the compensating tube 75.

The most advantageous firing angle of the thyratron 21 is 90°, since under these conditions a uniform correcting action is obtained in both directions, i. e., for both an increase and decrease of the line voltage relative to its normal operating value. No compensation for a decrease in line voltage can be obtained when the firing angle of the thyratron is zero, i. e., when the rectified direct current is at the maximum. On the other hand, the operating point on the alternating current-direct current characteristic of the saturable reactor should lie on the proper portion of this characteristic.

Therefore, in order to control the amount of compensation and to adjust it to the particular type of saturable reactor used, the potentiometer 89 is provided in the primary circuit of the phase-shift transformer 83. Thus, the amplitude of the alternating current components of the grid voltage of tube 21 can be varied with the result that its increase will cause a proper decrease in compensating action and vice versa. Thus, for a higher alternating current component $E_1$ of the grid voltage, for example, a certain definite change in the line voltage will cause a change in the direct current in coil 15 of the saturable reactor smaller than that caused by the same change in line voltage but for a lower value of the component alternating current grid voltage $E_1$. Thus, the potentiometer 89 may also be used for varying and adjusting the sensitivity of the control system, although I prefer using for this purpose the potentiometer 35 as described in the foregoing.

Furthermore, it should be noted that an increase in filament voltage of the saturated diode at 75 would normally result in greater change of the diode plate current in circuit 76 and hence in a greater change of the voltage $E_4$ across resistor 71 than the same percentile decrease in filament voltage. This is due to the saturated diode characteristics shown in Fig. 4. To prevent this and to make changes in voltage across resistor 71 more linear, the resistor 74 is inserted in the plate circuit 76 of the diode to limit the current charging the capacitor 72.

In summarizing the foregoing, it will be seen that the control system illustrated in Fig. 1 is, in fact, capable of eliminating the fluctuations in load voltage and power heretofore apt to occur as a result of fluctuations in line voltage. The system is distinguished by a considerable increased stability of control and permits using a droop correcting device to the full extent of desired droop correction eliminating the undesirable response of droop corrector to the line voltage variations. By virtue of these qualities and as shown in the foregoing, a system of this type is very advantageous whenever the line voltage is subject to fluctuation and affords a high degree of accuracy in maintaining a constant load voltage. Due to this accuracy of control, the system permits the use of a highly sensitive measuring and control arrangement with a wide range of adjustability as regards the range of load voltages or temperatures to be controlled and also as regards the selective range of sensitivity. It will be also seen from the foregoing that a voltage compensating arrangement according to the invention can be adjusted within wide limits so as to operate the gaseous discharge rectifier and the saturable control reactor at the most favorable points of their respective operating characteristics.

Figure 6:
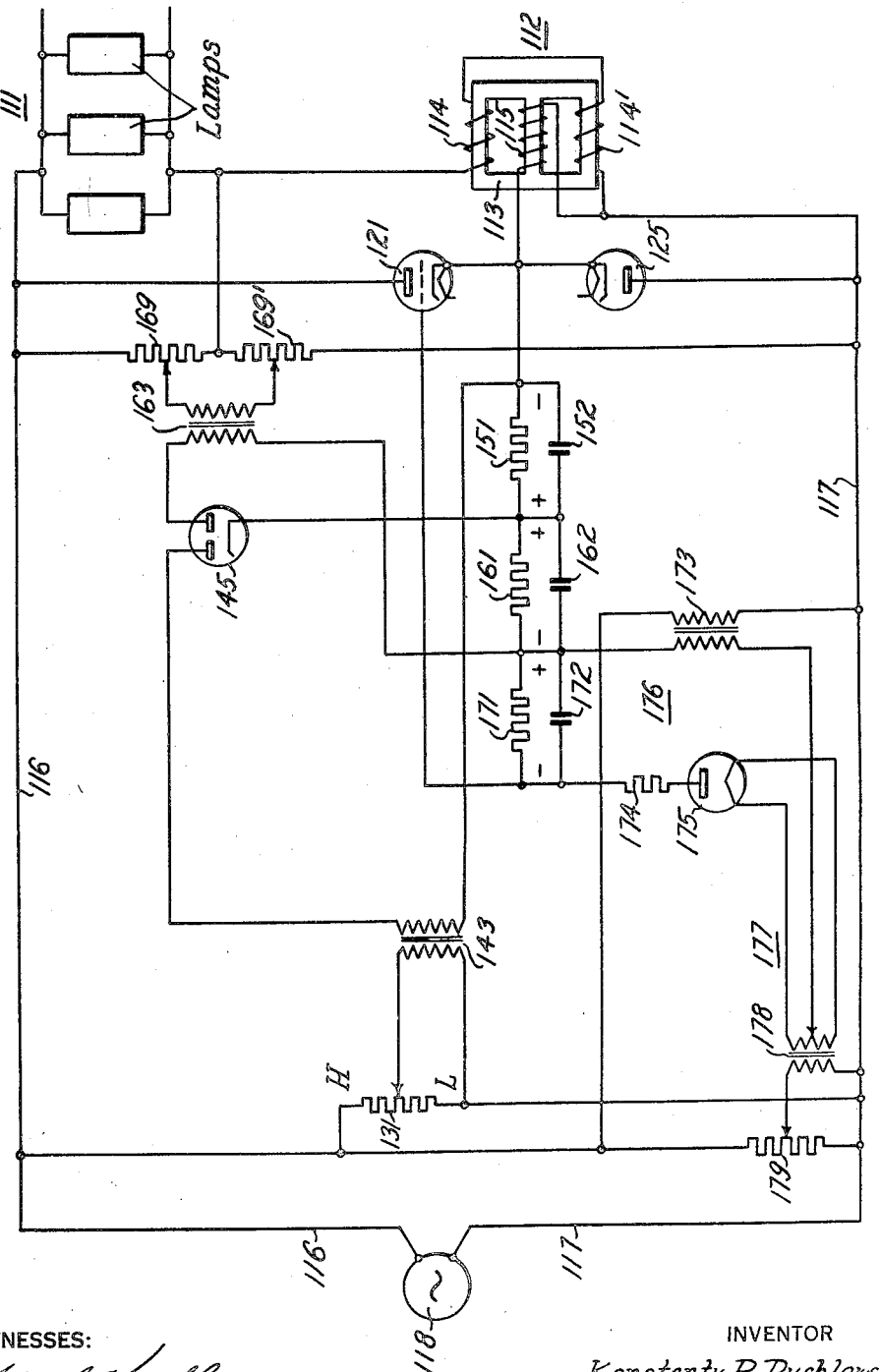
Fig. 6 is a circuit diagram of another control system serving for the control of the luminous output of lamps as used, for instance, for theater illumination.

The embodiment shown in Fig. 6 represents a modified form of the invention which is based on the same principles and contains similar basic circuit elements and circuit sections as the system of Fig. 1. In order to facilitate and simplify the following explanation of Fig. 6, the last two digits of the reference numerals used in Fig. 6 are identical with the reference numerals of Fig. 1 wherever functionally similar elements are concerned.

The control system according to Fig. 6 serves for controlling the supply of power to a group of lamp circuits 111 used, for instance, for stage illumination. A control potentiometer 131 to be operated manually or by suitable automatic means serves to control the power supply in order to regulate the luminous output of the lamp circuits 111.

The alternating current coils 114 and 114' of a saturable reactor 112 are connected in series with the lamp circuits 111 between the supply mains 116 and 117 fed from the line or a corresponding alternating current source represented at 118. The magnetizable and saturable core 113 of reactor 112 carries also a premagnetizing coil 115. This coil is fed from two gaseous discharge rectifier tubes 121 and 125 connected with the coil 115 and the mains 116 and 117 in the same way as described in connection with Fig. 1. The grid circuit of the discharge rectifier 112 extends over three series-connected resistors 151, 161 and 171 to which respective capacitors 152, 162 and 172 are connected in parallel arrangement. The three resistors serve to impress three component grid voltages on the grid circuit, these component voltages having the polarities indicated by (+) and (−) signs.

The component grid voltage across resistor 151 is controlled by the above-mentioned potentiometer 131 by a control circuit designed and operating as follows.

The control potentiometer 131 is fed from the supply mains 116 and 117 and has its secondary circuit connected through a transformer 143 to the circuit of a high-vacuum diode rectifier 145. The rectified current produces across the resistor 151 a direct-current voltage whose magnitude depends on the slider adjustment of the potentiometer 131.

The component grid voltage across resistor 161 is produced and controlled by a cut-off and maximum load adjustment circuit which is fed from two series-connected potentiometers 169 and 169' through a transformer 163 whose secondary is connected through a diode section of tube 145 so as to impress across resistor 161 a voltage whose magnitude depends on the adjustment of the potentiometers 169 and 169'. The series-connection of these potentiometers is arranged across the supply mains 116 and 117 while the mid-point is connected between the lamp circuits 111 and the reactor 112. Consequently, the voltage across the potentiometer 169 is proportional to the load voltage to be controlled by adjusting the slider of potentiometer 131.

The values of resistances and capacitances of the impedance combinations 151, 152 and 171, 172 are so chosen that the time constant of these combinations is relatively large as compared with the cycle duration of the line voltage, the capacitance of capacitor 162 is comparatively small so that the time constant of the impedance combination 161, 162 is of an order of magnitude similar to that of the line frequency. Consequently, the voltage component impressed across resistor 161 is variable at the frequency of the line voltage, while the two other component grid voltages are virtually constant.

The minimum value of the component grid voltage across resistor 161 can be so chosen that the discharge tube 121 is nonconductive and the load voltage zero when the slider of the control potentiometer 131 is in the position denoted by L. Similarly, the maximum voltage and hence the maximum light intensity produced at the lamp circuits when the slider of the control potentiometer 131 is in the position denoted by H, can be adjusted to a desired magnitude by a corresponding slider adjustment of potentiometer 169.

The component grid voltage effective across resistor 171 is produced by a compensating circuit which includes a saturated high-vacuum diode 175. The plate circuit of this diode is energized by a line-fed transformer 173 and connected to resistor 171 through a current-limiting series resistor 174. The filament circuit 177 of tube 175 is energized by a transformer 178 connected to a potentiometer 179 which, in turn, is energized from the supply mains 116 and 117. The operation of the compensating circuit is similar to that of the system shown in Fig. 1.

The resultant grid voltage controlling the operation of the tube 121 is composed of the components across resistors 151, 161 and 171. It will be understood from the foregoing detailed explanation of the corresponding elements and circuits of Fig. 1 that the control function of the lamp control system of Fig. 6 is substantially similar and affords a corresponding compensation of fluctuations in line voltage as regards their effect on the voltage and power of the load.

I claim as my invention:

1. A system for controlling the power supply to a load circuit, comprising a saturable reactor having an alternating current winding series-connected with said load circuit and a direct-current winding for varying the reactance of said alternating current winding, supply means for feeding alternating current to said load circuit, a gaseous discharge rectifier arranged between said supply means and said direct-current winding for providing the latter with rectified current and having a grid circuit for controlling said current, adjustable voltage supply means connected to said grid circuit to impose thereon a variable grid voltage, an impedance member series-connected in said grid circuit, and a diode having a filament circuit connected to said supply means and a plate circuit connected across said member for superimposing on said grid circuit an additional direct-current grid voltage varying in proportional and amplified relation to voltage fluctuations of said supply means so as to compensate the effect of said fluctuations on the power supplied to said load circuit.

2. A system for controlling the power supply to a load circuit, comprising a saturable reactor having an alternating current winding connected in said load circuit and a direct-current winding for varying the reactance of said alternating current winding, supply means for feeding alternating current to said load circuit, a gaseous discharge rectifier arranged between said supply means and said direct-current winding for providing the latter with rectified current and having a grid circuit for controlling said current, a source of variable grid voltage connected with said grid circuit and containing adjusting means for regulating said grid voltage so as to vary the firing angle of said discharge rectifier, and a saturated diode having a filament circuit connected to said supply means so that the filament current varies in accordance with voltage fluctuations of said supply means, said diode having a plate circuit connected to said grid circuit for superimposing thereon a modifying direct-current grid voltage varying in proportional and amplified relation to said voltage fluctuations so as to increase and decrease said firing angle for a decrease and increase respectively in the voltage of said supply means.

3. A system for controlling the power supply to a load circuit, comprising a saturable reactor having an alternating current winding connected in said load circuit and a direct-current winding for varying the reactance of said alternating current winding, supply means for feeding alternating current to said load circuit, a gaseous discharge rectifier arranged between said alternating current supply means and said direct-current winding for providing the latter with rectified current and having a grid circuit for controlling said current, a control network connected with said grid circuit and comprising a phase shifting circuit attached to said supply means for providing said grid circuit with a variable component grid voltage of the frequency of said alternating load current, control means disposed in said control network for varying said grid voltage so as to displace the firing angle of said rectifier, a saturated diode having a filament circuit connected to said supply means so that the filament current varies in accordance with voltage fluctuations of said supply means, said diode having a plate circuit connected to said control network for superimposing on said grid voltage a direct-current component varying in propor-tional and amplified relation to said voltage fluctuations so as to increase and decrease said firing angle for a decrease and increase respectively in the voltage of said supply means, and variable impedance means interposed between said phase shifting circuit and said supply means for adjusting the amplitude of said variable grid voltage relative to that of said direct-current component.

4. A system for controlling the power supply to a load, comprising a saturable reactor having an alternating current winding connected with said load and a direct-current winding for varying the reactance of said alternating current winding, supply means for feeding alternating current to said load, a gaseous discharge rectifier arrangement disposed between said alternating current supply means and said direct-current winding for providing the latter with rectified current and having a grid circuit for controlling said current, a control circuit containing two series-connected impedance devices and being connected between said supply means and said grid circuit for supplying the latter with a component alternating current grid voltage of the frequency of said load current, an adjustable source of direct-current voltage connected across one of said impedance devices for superimposing on said grid circuit a direct-current component for varying the firing angle of said rectifier, and a voltage-responsive source of another direct-current voltage controlled by said supply means so as to supply a direct-current voltage in dependence upon voltage fluctuations of said supply means and being connected across said other impedance device for superimposing on said grid voltage another voltage component for compensating the effect of said fluctuations on the voltage of said load.

5. A system for controlling the power supply to a load circuit, comprising a saturable reactor having an alternating current winding connected in said load circuit and a direct-current winding for varying the reactance of said alternating current winding, supply means for feeding alternating current to said load circuit, a gaseous discharge rectifier arrangement disposed between said alternating current supply means and said direct-current winding for providing the latter with rectified current and having a grid circuit for controlling said current, a control circuit having two series-connected impedance devices and including a phase-shifting transformer circuit connected to said supply means for imposing on said grid circuit a component alternating current grid voltage, an adjustable source of direct-current voltage connected across one of said impedance devices for superimposing on said grid voltage a direct-current component for varying the firing angle of said rectifier, an amplifying rectifier arrangement having an input circuit connected to said supply means and an output circuit connected across said other impedance device for superimposing on said grid voltage a rectified direct-current component for compensating the effect on said power supply of voltage fluctuations of said supply means, and variable circuit means forming part of said transformer circuit for adjusting the amplitude of said component alternating current grid voltage in order to adjust the compensating effect of said arrangement.

6. A system for controlling the power supply to a load circuit, comprising a saturable reactor having an alternating current winding connected in said load circuit and a direct-current winding for varying the reactance of said alternating current winding, supply means for feeding alternating current to said load circuit, a gaseous discharge rectifier arrangement disposed between said supply means and said direct-current winding for providing the latter with rectified current and having a grid circuit for controlling said current, a control circuit having three series-connected impedance devices and including a phase-shifting transformer circuit connected to said supply means for imposing on said grid circuit a component alternating current grid voltage, an adjustable source of direct-current voltage connected across one of said impedance devices for superimposing on said grid voltage a direct-current component for varying the firing angle of said rectifier, a compensating rectifier network having an input circuit connected to said supply means and an output circuit connected across another one of said impedances devices for superimposing on said grid voltage another direct-current component for compensating the effect on said power supply of voltage fluctuations of said supply means, and a maximum load adjustment circuit having a direct-current source connected across the third of said impedance devices so as to impose on said grid voltage a third direct-current component in opposition to said other component direct-current voltages, said adjustment circuit containing a variable circuit member for adjusting the magnitude of the resultant grid voltage in order to limit said rectifier current to a desired maximum.

7. A system for controlling the power supply to a load circuit, comprising a saturable reactor having an alternating current winding connected in said load circuit and a direct-current winding for varying the reactance of said alternating current winding, supply means for feeding alternating current to said load circuit, a gaseous discharge rectifier arrangement disposed between said supply means and said direct-current winding for providing the latter with rectified current and having a grid circuit for controlling said current, a control circuit containing two series-connected impedance devices and being connected between said supply means and said grid circuit for supplying the latter with a component alternating current grid voltage of the frequency of said load current, an adjustable source of direct-current voltage connected across one of said impedance devices for superimposing on said grid voltage a direct-current component for varying the firing angle of said rectifier, a voltage-responsive other source of direct-current voltage controlled by said supply means so as to vary its direct-current voltage in dependence upon voltage fluctuations of said supply means and being connected across said other impedance device for superimposing on said grid voltage another direct-current component for compensating the effect of said fluctuations on the power supplied to said load circuit, and droop correcting means associated with said control circuit and comprising an input circuit attached to said load circuit to respond to the effective load voltage and an output circuit connected with said control circuit for modifying the resultant grid voltage so as to boost changes in load voltage in accordance with a desired droop compensation.

8. A system for controlling the power supply to a load circuit, comprising a saturable reactor having an alternating current winding connected in said load circuit and a direct-current winding for varying the reactance of said alternating current winding, supply means for feeding alternating current to said load circuit, a gas discharge rectifier arranged between said alternating current supply means and said direct-current winding for providing the latter with rectified current and having a grid circuit for controlling said current, adjustable voltage supply means connected to said grid circuit to impose thereon a grid voltage for controlling the firing angle of said discharge device, a saturated diode having a filament circuit connected to said supply means so that the filament current varies in accordance with voltage fluctuations of said supply means, said diode having a plate circuit connected to said grid circuit for superimposing thereon a modifying direct-current grid voltage varying in proportional and amplified relation to said voltage fluctuations so as to compensate the effect of said fluctuations on the power to be controlled, a variable potentiometric device interposed between said filament circuit and said grid circuit for adjusting the amplitude of said modifying grid voltage, and a current limiting resistance arranged in said plate circuit for biasing said modifying voltage.

9. A system for controlling the condition of an electric load device, comprising a saturable reactor having an alternating current winding arranged in series connected with said device and a direct-current winding for varying the reactance of said alternating current winding, alternating current supply mains connected to said series-connection, a gas discharge rectifier arrangement disposed between said mains and said direct-current winding for providing the latter with rectified current and having a grid circuit for controlling said current, condition-responsive control means arranged in proximity to said device, a balanceable measuring network having a balancing branch connected with said other impedance device to superimpose on said grid circuit a component direct-current grid voltage in accordance with the balance condition of said branch, a circuit member disposed in said network for adjusting the datum value of said balance condition, a variable circuit member also arranged in said network and controlled by said control means for varying said condition in accordance with variations of the condition to be controlled whereby said latter component direct-current voltage is caused to vary the firing angle of said rectifier in dependence upon said temperature variations, and a saturated diode having a filament circuit connected to said mains so that the filament current varies in accordance with voltage fluctuations of said supply means, said diode having an output circuit connected across said other impedance device for superimposing on said grid circuit another component direct-current voltage for compensating the effect of said voltage fluctuations on said condition of said device.

KONSTANTY P. PUCHLOWSKI.

REFERENCES CITED

The following references are of record in the file of this patent:

UNITED STATES PATENTS

| Number | Name | Date |
|---|---|---|
| 1,968,634 | Chambers | July 31, 1934 |
| 1,972,696 | Suits | Sept. 6, 1934 |
| 1,991,248 | Hartigan | Feb. 12, 1935 |
| 2,246,179 | Lord | June 17, 1941 |
| 2,250,207 | Schneider | July 22, 1941 |
| 2,266,569 | Schneider | Dec. 16, 1941 |
| 2,294,775 | Edwards et al. | Sept. 1, 1942 |
| 2,330,377 | Phair | Sept. 28, 1943 |